Patented Jan. 8, 1924.

1,479,874

UNITED STATES PATENT OFFICE.

GILBERT E. SEIL, OF OAKMONT, PENNSYLVANIA, ASSIGNOR TO THE ROESSLER & HASSLACHER CHEMICAL COMPANY, A CORPORATION OF NEW YORK.

PROCESS OF HYDROLYZING NITRILES.

No Drawing.      Application filed October 15, 1921. Serial No. 507,879.

*To all whom it may concern:*

Be it known that I, GILBERT E. SEIL, a citizen of the United States, and resident of Oakmont, in the county of Allegheny and State of Pennsylvania, have invented certain new and useful Improvements in Processes of Hydrolyzing Nitriles, of which the following is a specification.

It is well known that organic nitriles can be converted into corresponding acids by hydrolysis in the presence of acids, as for example, hydrochloric acid according to a reaction which may be represented by the equation $$RCN + 2H_2O + HCl = RCOOH + NH_4Cl$$

While this means is effective in hydrolyzing nitriles, it is also effective in the promotion of side reactions, the products of which are not the desired organic acid.

I have found that the nitriles of alpha-oxy-acids, for example, when heated in the presence of water and dilute mineral acids, easily decompose to the corresponding aldehyde or ketone, and hydrocyanic acid. It is also known that the alpha-oxy-acids decompose when heated in the presence of dilute aqueous mineral acids into the corresponding aldehydes, or ketones, and formic acid. The formic acid is in turn decomposed by the mineral acid into carbon monoxid and water. A molecule of dihydrate of sulphuric acid contains two molecules of water and one molecule of suphuric acid, chemically combined, which I have discovered does not give up its water in this reaction, except as required in the formation of the acid, or carboxyl group, and acid ammonium sulphate.

I have now discovered that this decomposition is due to the presence of uncombined water, and the process heretofore has been uncommercial because of low yield, long period of time required and more or less decomposition of the organic acid, depending upon the amount of uncombined water present. To overcome these difficulties, I use as a source of water of hydrolysis a substance, preferably a liquid, which contains water completely combined, as for instance a hydrate, and further preferably employ such hydrate in substantially the molecular amount required for the conversion. An example of such hydrate is dihydrate of sulphuric acid $H_2SO_4,2H_2O$, which is a definite chemical compound. In conjunction with the dihydrate of sulphuric acid, I have found that the use of a chlorid, such as the chlorid of sodium, ammonium, calcium, etc., acts as a catalyst in increasing the velocity of the reaction. Such reaction may be expressed as follows:

$$RCN + H_2SO_4.2H_2O \text{ (in presence of NH}_4\text{Cl)} = RCOOH + (NH_4)HSO_4 (+ NH_4Cl)$$

The products of this reaction are anhydrous organic acid and the acid ammonium sulphate. The ammonium chlorid does not change essentially in quantity, although it may not be the same ammonium chlorid which was originally added.

In this invention the chlorid ions, and in a broad sense the hydrochloric acid may be regarded as a catalyst, although I consider that the reaction is more properly cyclic than purely catalytic.

I have found that in general, any halogen salt, such as an iodid, bromid, chlorid or fluorid of sodium, ammonium, calcium, etc., is effective as a promoter or catalyst in this reaction. However, chlorids and fluorids have been found to be most effective and the bromids and iodids have been found to be undesirable in this process because of their tendency to set up disturbing side reactions.

The catalyst as described above reacts with the dihydrate of sulphuric acid to liberate hydrochloric acid or its equivalent and two molecular equivalents of water, which then reacts with the nitrile group. The dihydrate of sulphuric acid reacts with the compound formed by the liberated or initial hydrochloric acid, yielding the desired organic acid and the acid ammonium sulphate, reforming hydrochloric acid and water, which reacts with more nitrile, etc., which continues until the reaction is complete. In other words, the catalyst enters a cylic reaction and continues its addition and liberation by the dihydrate of sulphuric acid until all of the nitrile is converted. By dihydrate of sulphuric acid I mean that compound which is formed with three molecules of water reacting with sulphuric anhydrid ($SO_3$), or with two molecules of water reacting with one molecule of monohydrate of sulphuric anhydrid ($H_2SO_4$), or such compound formed in any other way.

In some cases the hydrolysis takes place so rapidly as to cause excessive increase in temperature resulting in the formation of undesirable products. To counteract this I may use a heat diluent, such a material preferably being inert in respect to the reaction materials and having a boiling point which prevents the reacting mass from reaching too high a temperature. For the specific example herein given, carbon tetrachlorid is a diluent especially suitable for cyanhydrins.

As an illustration of my invention, I shall describe the production of alpha-oxy-isobutyric acid by the hydrolysis of the cyanhydrin of acetone, but it should be understood that my invention is a group reaction and is applicable to the hydrolysis of various types of nitriles and cyanhydrins, and is not limited in scope except as set forth in the appended claims.

My preferred procedure is as follows:

9.8 pounds of sulphuric acid are mixed with 3.5 pounds of water and cooled to 20° C. The resulting liquid is the dihydrate of sulphuric acid. To this liquid is added 8.5 pounds of the cyanhydrin of acetone. I also add a small amount of a soluble chlorid, for example, one ounce of ammonium chlorid, because I have discovered that the desired hydrolysis proceeds more smoothly and more rapidly in the presence of such chlorids. To this mixture is added, about an equal or less weight of the total $H_2SO_4$ and cyanhydrin present, depending upon the desired rate of reaction, of a suitable liquid heat diluent such as carbon tetrachlorid. The charge is then transferred to a closed vessel of acid resisting material and refluxed for a period of one to five hours. If a heat diluent is not used the reaction may proceed too rapidly and generate too much heat, thereby causing decomposition. The products of the reaction are the anhydrous organic acid, the acid ammonium sulphate, together with a small amount of ammonium and chlorid ions originally added. The chlorid ions are therefore regarded as a catalyst or promoter in this reaction.

Upon cooling the reaction mass, the ammonium bisulphate crystallizes out together with some of the oxyisobutyric acid, depending upon the amount of carbon tetrachlorid used. The desired acid can be easily recovered by extraction with carbon tetrachlorid or other solvent by known methods such as distillation, sublimation, extraction, etc.

The proportions given in the above specific example may vary without departing from the scope of the appended claims.

What I claim is:

1. The improvement in the manufacture of alpha-oxy-acids which consists in treating alpha-oxy-nitrile with the dihydrate of sulphuric acid.

2. The process of hydrolyzing alpha-oxy-nitriles to the corresponding alpha-oxy-acids by treating one molecule of the alpha-oxy-nitrile with substantially one molecule of the dihydrate of sulphuric acid in the presence of a catalyst.

3. The process of hydrolyzing cyanhydrin of acetone to the alpha-oxyisobutyric acid by treating one molecule of the alpha-oxyisobutyric nitrile with substantially one molecule of the dihydrate of sulphuric acid in the presence of a catalyst.

4. The process of hydrolyzing the alpha-oxy-nitrile to the alpha-oxy-acid by treating one molecule of the alpha-oxy-nitrile dissolved in an inert solvent with substantially one molecule of dihydrate of sulphuric acid in the presence of a catalyst.

5. The process of hydrolyzing cyanhydrin of alpha-oxyisobutyric acid by treating one molecule thereof dissolved in an inert solvent with substantially one molecule of the dihydrate of sulphuric acid in the presence of a catalyst.

6. The improvement in treating alpha-oxy-nitrile with a hydrate of an acid free of uncombined water.

7. The improvement in treating alpha-oxy-nitrile with a hydrate of an acid free of uncombined water in the presence of a promoter.

8. The improvement in the manufacture of an alpha-oxy-acid which consists in treating alpha-oxy-nitriles with the dihydrate of sulphuric acid, in the presence of a promoter.

9. The improvement in the manufacture of alpha-oxy-acids which consists in treating alpha-oxy-nitriles with the dihydrate of sulphuric acid, in the presence of a promoter, at a temperature below the decomposition temperature of the reacting acid and of other products used as raw materials.

10. The improvement in the manufacture of alpha-oxy-isobutyric acid which consists in treating alpha-oxy-isobutyric nitrile with the dihydrate of sulphuric acid in the presence of ammonium chloride and in the presence of carbon tetrachloride.

Signed at Pittsburgh, in the county of Allegheny and State of Pennsylvania, this 13th day of October, A. D., 1921.

GILBERT E. SEIL.